(12) United States Patent
Curtis

(10) Patent No.: US 8,550,375 B2
(45) Date of Patent: Oct. 8, 2013

(54) SPRINKLER HEAD GUARD

(76) Inventor: Tim Curtis, Cavejunction, OR (US)

(*) Notice: Subject to any disclaimer, the term of this patent is extended or adjusted under 35 U.S.C. 154(b) by 116 days.

(21) Appl. No.: 13/021,725

(22) Filed: Feb. 5, 2011

(65) Prior Publication Data

US 2011/0198410 A1    Aug. 18, 2011

Related U.S. Application Data

(60) Provisional application No. 61/304,897, filed on Feb. 16, 2010.

(51) Int. Cl.
*B05B 15/04* (2006.01)
*B05B 1/28* (2006.01)

(52) U.S. Cl.
USPC ........ 239/288.5; 239/204; 173/102; 173/103; 248/87; 248/156; 52/155

(58) Field of Classification Search
USPC ............... 239/201, 203, 288.5, 204; 173/102, 173/103; 248/87, 156; 52/155
See application file for complete search history.

(56) References Cited

U.S. PATENT DOCUMENTS

| | | | |
|---|---|---|---|
| 4,649,678 A * | 3/1987 | Lamson | 52/103 |
| 4,781,327 A * | 11/1988 | Lawson et al. | 239/203 |
| 5,037,030 A | 8/1991 | Apodaca | |
| 5,213,262 A | 5/1993 | Violette | |
| 5,772,118 A * | 6/1998 | Fabiano | 239/276 |
| 5,938,121 A * | 8/1999 | Ferguson et al. | 239/203 |
| 6,243,986 B1 * | 6/2001 | Crowley | 47/48.5 |
| 6,543,704 B2 | 4/2003 | Stephens | |
| 6,764,025 B1 * | 7/2004 | Espina | 239/288 |
| 7,114,665 B1 | 10/2006 | Mc Tee | |
| 7,717,360 B1 * | 5/2010 | Kander | 239/208 |

\* cited by examiner

*Primary Examiner* — Dinh Q Nguyen
(74) *Attorney, Agent, or Firm* — Daniel Boudwin

(57) ABSTRACT

A cylindrical, protective housing and accompanying insertion tool for shielding an in-ground sprinkler head. The cylindrical housing is inserted into the ground surrounding an in-ground sprinkler head, protecting the sprinkler head and subterranean feed lines from damage resulting from yard work or other traffic. The cylindrical housing prevents inadvertently sprinkler head collisions with lawn mowers, wheelbarrows, golf carts, or similarly wheeled vehicles. The insertion tool is a male-fitting press tool that provides vertical loads on the cylindrical housing upper extent to force it into soil surrounding a sprinkler head.

3 Claims, 1 Drawing Sheet

SPRINKLER HEAD GUARD

CROSS REFERENCE TO RELATED APPLICATION

This application claims the benefit of U.S. Provisional Application No. 61/304,897 filed on Feb. 16, 2010, entitled "Sprinkler Head Guard"

BACKGROUND OF THE INVENTION

1. Field of the Invention

The present invention relates to in-ground sprinkler head protective housings and deployment tools for inserting a housing around a sprinkler head installation.

2. Description of the Prior Art

In-ground sprinkler systems employ a network for subterranean water lines that feed individual sprinkler heads distributed over a given area for irrigation purposes. The sprinkler heads themselves are generally deployable structures that lift above the ground surface to irrigate an area surrounding its location. While not in use, the sprinkler head and associated installation is exposed along the ground surface, introducing a risk of impact with landscaping equipment and other passing vehicles.

Sprinkler head impacts can cause considerable damage to the sprinkler head, as well as to the system as a whole. The head of the sprinkler can become dysfunctional or broken off from its base structure. Even worse, the feed lines may be damaged, necessitating costly repairs for the owner. A solution to this problem is required.

Several devices in the art have been suggested for shrouding and protecting an in-ground sprinkler head. These devices describe integrated housings and protective shrouds that require installation while the sprinkler is being installed in the ground. A need arises for deploying a low-cost protective housing after an in-ground sprinkler system has been installed to protect the sprinkler heads during landscaping activities and from passing vehicles.

SUMMARY OF THE INVENTION

In view of the foregoing disadvantages inherent in the known types of in-ground sprinkler head protectors now present in the prior art, the present invention provides a new in-ground sprinkler head protector wherein the same can be utilized for providing convenience for the user when deploying a protective housing around an in-ground sprinkler head after its installation.

It is therefore an object of the present invention to provide a cylindrical, in-ground sprinkler head protector housing that prevents impact with lawn equipment and passing vehicles.

Another object of the present invention is to provide an associated hand tool that allows easy installation of the protector housing around an in-ground sprinkler head.

Yet another object of the present invention is to provide a protective housing that is capable of deployment after installation of an in-ground sprinkler system, and one that is a low cost solution to protecting exposed sprinkler heads.

Other objects, features and advantages of the present invention will become apparent from the following detailed description taken in conjunction with the accompanying drawings.

BRIEF DESCRIPTIONS OF THE DRAWINGS

DETAILED DESCRIPTION OF THE INVENTION

Figure 1:
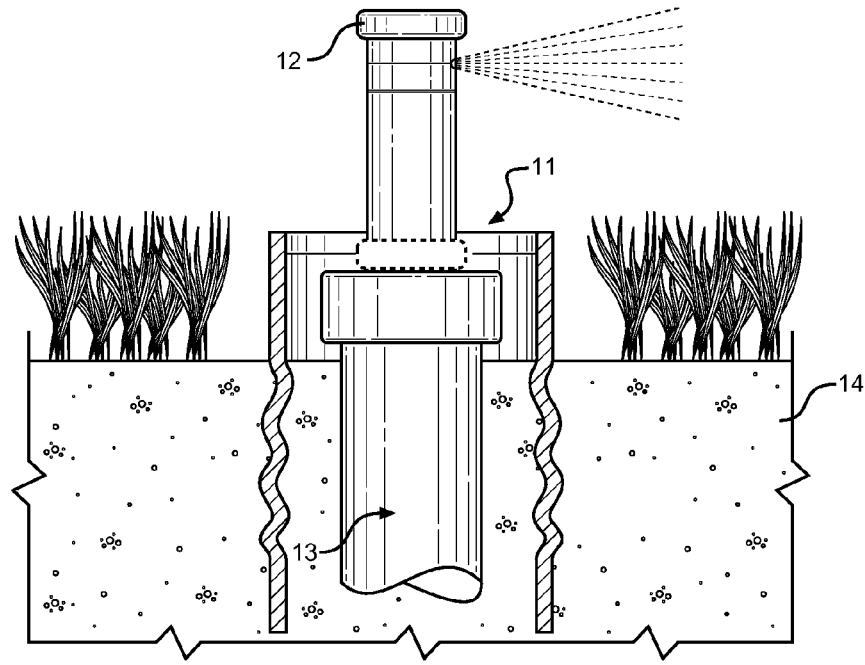
FIG. 1 shows a cross-sectional side view of an installed in-ground sprinkler head protector housing imbedded in the ground surrounding a deployed sprinkler head.

Referring now to FIG. 1, there is shown a cross-sectional side view of a protective housing 11 mounted circumferentially about an in-ground sprinkler head installation 13. The housing 11 is imbedded into the soil 14 around the sprinkler installation 13. The installed housing 11 protrudes above the soil 14 top surface and above the top of the sprinkler installation 13 to protect it from inadvertent contact with landscaping equipment and passing vehicles such as tractors and golf carts. The head of the sprinkler 12 extends above the upper extent of the protective housing 11 during operation, allow unobstructed operation during irrigation.

Figure 2:
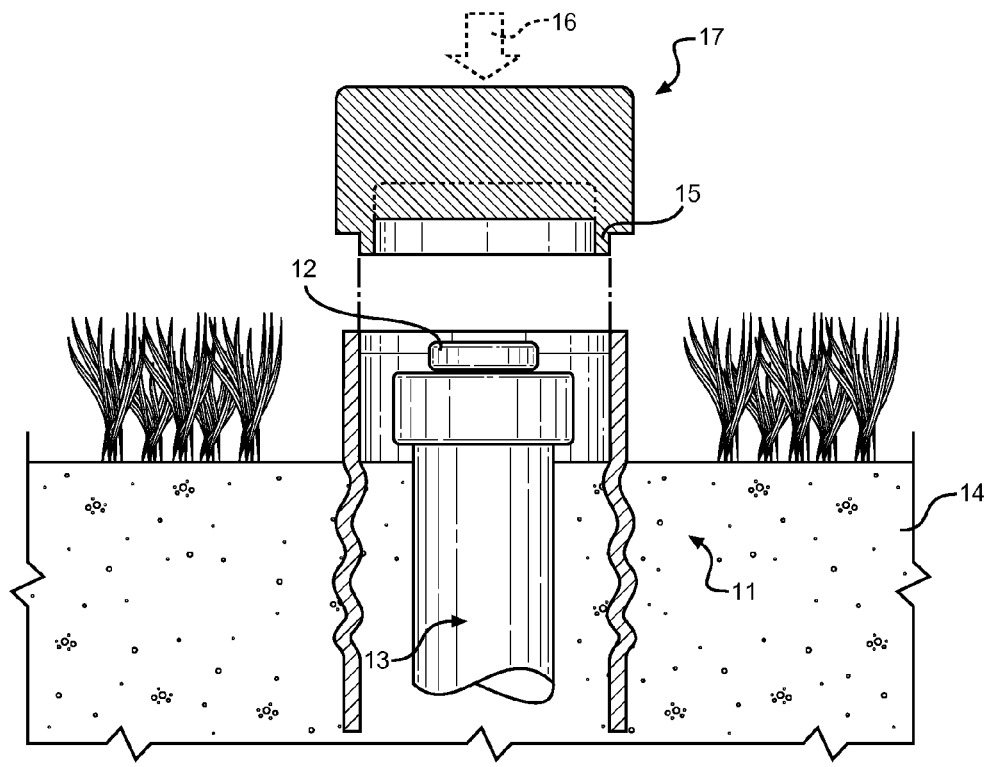
FIG. 2 shows a second cross-sectional side view of an in-ground sprinkler head protector housing and an insertion tool for installing the housing around an in-ground sprinkler head.

Referring now to FIG. 2, there is shown a second cross-sectional side view of a protective housing 11 surrounding an in-ground sprinkler head installation 13, along with an associated insertion tool 17. The insertion tool 17 is a hollow or solid drive tool that integrally fits into the opening at the upper extent of the protective housing 13. A notch 15 along its lower edge provides a decreased diameter section that fits into the protective housing 11 upper extent, providing a male-fitting tool that is capable of transferring vertical loads 16 onto the housing 11 during insertion into the soil 14. During this operation, the sprinkler head 12 is in its non-functioning state, and withdrawn into the sprinkler installation 13.

In use an individual uses the insertion tool 17 to press a cylindrical, protective housing 11 into the ground 14 surrounding a sprinkler head installation 13. The housing 11 is comprised of a hollow cylinder with a wall thickness sufficient to withstand the vertical loads imparted by the insertion tool 17. The walls comprise a material and gauge that is structurally sufficient to support the required column loading during installation without risking column buckling or local crippling. The material is also such that interaction with other sprinkler components and outdoor elements will not corrode the housing. The housing may be chosen from a number of common metallic or plastic materials suitable for these requirements, including aluminum, steel, tin, and other various thermoset plastics.

In an alternative embodiment, the sidewalls of the cylindrical housing are comprised of an undulating surface, whose cross-section resembles a central sine wave section surrounded by two straight upper and lower sections. The undulating sidewall provides protuberances along its surface to help stabilize the housing in the soil and keep it firmly in place. This is of particular use when the soil is moist, or when absorbing an impact from an external source such as a lawnmower or golf car tire.

The disclosed invention provides an aftermarket protective housing for installed sprinkler systems, and one that is low cost and easily installed. The housing protects the investment in time and money for in-ground sprinkler systems. Typical sprinkler systems can be found on golf courses, in parks or on personal properties. Maintaining these areas places the sprinkler heads in close proximity to lawn equipment and wheeled vehicles that may contact and damage the sprinkler systems. The disclosed housing provides a robust guard that solves these known issues.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A protective housing for an in-ground sprinkler head to prevent impact damage from lawn equipment and other vehicles, comprising:

a thin-walled, one-piece, cylindrical housing with an upper and lower extent, said extents having uniform diameter and said extents are rounded openings, said housing lower extent is adapted for insertion into a ground surface and said housing upper extent protrudes above a horizontal plane defined by a ground surface when in use;

a cylindrical insertion tool with an upper surface having a rounded upper edge and a wall extending downward from said upper edge and having a rounded lower edge, said rounded lower edge is notched to provide an edge with a smaller circumference than said cylindrical housing upper extent, wherein said cylindrical insertion has a hollow recess extending upward from said lower edge into said insertion tool and is adapted to receive an upper portion of an in-ground sprinkler head when in use;

said insertion tool lower edge vertically engages and fits flushly along an interior surface of said housing upper extent and wherein force applied to said upper surface of said insertion tool when said insertion tool is engaged with said cylindrical housing upper extent will distribute vertical load on said housing, driving it into said ground surface.

2. The device defined in claim 1, wherein said thin-walled, cylindrical housing has a plurality of laterally protruding horizontal ridges disposed between said upper extent and said lower extent, wherein the diameter of said housing changes along said ridges, and wherein said ridges have a sinusoidal undulation along a portion of said housing.

3. A protective housing for an in-ground sprinkler head to prevent impact damage from lawn equipment and other vehicles, comprising:

a thin-walled, one-piece, cylindrical housing with an upper and lower extent, said extents having uniform diameter and separated by a sidewall having a plurality of laterally protruding horizontal ridges, wherein said diameter of said housing changes along said ridges, and said extents are rounded openings, said housing lower extent is adapted for insertion into a ground surface and said housing upper extent protrudes above a horizontal plane defined by a ground surface when in use;

a cylindrical insertion tool with an upper surface having a rounded upper edge and a wall extending downward from said upper edge and having a rounded lower edge, said rounded lower edge is notched to provide an edge with a smaller circumference than said cylindrical housing upper extent, wherein said cylindrical insertion has a hollow recess extending upward from said lower edge into said insertion tool and is adapted to receive an upper portion of an in-ground sprinkler head when in use;

said insertion tool lower edge vertically engages and fits flushly along an interior surface of said housing upper extent and wherein force applied to said upper surface of said insertion tool when said insertion tool is engaged with said cylindrical housing upper extent will distribute vertical load on said housing, driving it into said ground surface.

* * * * *